UNITED STATES PATENT OFFICE.

HEINRICH KRIEGSHEIM, OF NEW YORK, N. Y., ASSIGNOR TO THE PERMUTIT COMPANY, OF NEW YORK, N. Y., A CORPORATION OF DELAWARE.

PROCESS OF PURIFYING WATER.

1,305,123.     Specification of Letters Patent.     Patented May 27, 1919.

No Drawing.     Application filed September 20, 1918.   Serial No. 254,950.

*To all whom it may concern:*

Be it known that I, HEINRICH KRIEGSHEIM, a citizen of Germany, residing at New York, in the county of New York and State of New York, have invented certain new and useful Improvements in Processes of Purifying Water, of which the following is a specification.

This invention relates to processes of purifying water; and it comprises a process of completely removing hardness from hard waters wherein such a water is treated with alkaline-reacting precipitating reagents such as lime or lime and soda to remove the greater portion of the hardness-giving bodies therefrom; the water is then treated with acids or acid reacting bodies or salts of acids forming neutral salts with alkalis to react upon soluble or colloidal bodies remaining in the water after precipitation and the water is thereafter completely softened by exchange silicates; all as more fully hereinafter set forth and as claimed.

Hard water is water containing dissolved salts or compounds of lime or of magnesia or of both. In natural waters, these bodies may be present as carbonates ("carbonate hardness" or "temporary hardness") or as sulfates, chlorids, etc. ("non-carbonate hardness" or "permanent hardness"). The methods of softening water now in use depend on two principles: one being that of precipitation of lime and magnesia by various reagents and the other being an abstraction of lime and magnesia by certain insoluble exchange silicates or "zeolites." Precipitation may be effected by a wide variety of different salts, but as a rule lime and soda (sodium carbonate) or lime alone are used. The exchange silicates or zeolites are silicate compounds containing alkali and some amphoteric oxid, generally alumina or iron or both together. In this art, the term zeolite has acquired a meaning somewhat different from that given it in mineralogy where it is taken to mean certain crystallized silicates. As used in the water purifying art the term zeolite is much broader covering any body, whether crystallized, amorphous or colloid, which has the property of exchanging bases more or less rapidly for the bases of a solution brought into contact with the zeolite. On contact with hard water the exchange silicates or zeolites take up lime and magnesia, giving up alkali in their lieu, and completely soften the water. After a time when their activity is exhausted or is lessened, they are treated with a solution of common salt for regeneration and may then be reused. Unlike the exchange silicate method, precipitation methods do not give a completely softened water since the precipitation is never complete. The substances precipitated by the action of the reagents are all to some extent soluble in water. Another difficulty with the process is the necessity of quite accurately proportioning the chemicals used.

It is an object of the present invention to provide what may be termed a combination method utilizing both a precipitation and a treatment with exchange silicates, the bulk of the hardness-giving impurities especially the carbonates which can be removed by the inexpensive lime treatment being removed from the water by precipitation and the residue by exchange silicates. In so doing it is obvious that a comparatively small exchange silicate installation may be made capable of treating large volumes of water. After the precipitation and prior to the treatment with exchange silicates, the water receives an addition of acid or acid material to render it better adapted for such exchange silicate treatment. The acid used may be simply carbonic acid (carbon dioxid) or products of combustion containing the same; or it may be a strong acid, such as sulfuric acid. Ordinary niter cake, or acid sodium sulfate, is a convenient material to employ. Instead of using acids, salts of acid reaction containing what may be termed available acid, such as sulfate of iron (ferrous sulfate), sulfate of alumina (aluminum sulfate), alum, etc., may be employed. These acid-reacting salts when employed add another utility in that they flocculate and collect suspended or unprecipitated solids coming from the precipitating action. In precipitation, after the main precipitate forms and is removed there is usually a slow "after reaction" with production of another precipitate in small amount. The formation of gelatinous iron oxid or alumina, as the case may be, serves to envelop and carry down the fine particles in colloidal suspension.

In precipitation, the usual reagents employed are lime and soda; the lime serving to combine with the excess of carbon dioxid of the bicarbonates. The final result with most waters, is a clarified softened water still containing at least about 50 parts per million of hardness calculated as calcium carbonate ($CaCO_3$). The solubles in solution may be regarded as composed of free lime, unchanged sodium carbonate, magnesia and the sodium salts formed from the soda in the precipitation. Sometimes caustic soda (NaOH) is present. Part of the "after reaction" is due to slow reaction caused by the free lime and sodium carbonate or caustic soda, if present. The water after precipitation is usually alkaline in reaction.

In the water purifying art, waters are usually classified as acid, neutral and alkaline in reaction; an acid water being one which changes the color of the indicator methyl orange to the acid color while an alkaline water is one which gives color to a phenolphthalein solution. A water having neither an acid nor an alkaline reaction is called neutral. The alkalinity or, rather, the "total alkalinity" of a water represents its content of carbonate, bicarbonate, and hydroxid if the small amounts of silicate, borate, phosphate, etc., which are contained in traces only in most of the natural waters are neglected. The "total alkalinity" which is also sometimes called methyl orange alkalinity, is determined by the amount of acid required to make methyl orange show an acid color. The phenolphthalein alkalinity corresponds to the amount of acid required to make the alkaline reaction of a water disappear in the presence of phenolphthalein and the caustic alkalinity or causticity corresponds to the amount of acid required to neutralize the hydroxids dissolved in the water. All these are customarily expressed in terms of parts of calcium carbonate ($CaCO_3$) per million or milligrams per liter. Expressed in other terms, total alkalinity is the total basicity due to carbonates, bicarbonates and hydroxids; phenolphthalein alkalinity represents carbonates and hydroxids but not bicarbonates while caustic alkalinity is an expression for the hydroxids.

In the present invention the water coming from a precipitation treatment is treated with acid prior to exposing it to the action of the exchange silicates. In general, a water softened by the lime or the lime-soda process should not show a phenolphthalein alkalinity of more than 50 parts per million and a caustic alkalinity of more than 25 parts expressed as $CaCO_3$. In purifying by precipitation, it is usually necessary to have some caustic alkalinity in the effluent water to secure efficient removal of magnesia while some phenolphthalein alkalinity in excess of caustic alkalinity (the difference between phenolphthalein alkalinity and caustic alkalinity is often called soda ash alkalinity because it is considered to be an expression for the amounts of soda ash dissolved in the water) is necessary in securing efficient conversion of sulfates and chlorids.

In using exchange silicates it is desirable to have the water free from phenolphthalein alkalinity or at least free from caustic alkalinity in order to prevent after reactions in the zeolites and also any disintegrating action which the particular compounds to which phenolphthalein-alkalinity and caustic-alkalinity in the water are due, may have upon the zeolites, when such water is passed through the zeolites continuously. The amount of acid or acid salt used in the present invention may be merely that necessary to obviate the caustic alkalinity; or it may be enough to obviate also the phenolphthalein alkalinity more or less completely. Any alkalinity over and above the phenolphthalein alkalinity is not worth while removing. Where the total alkalinity is larger than the phenolphthalein alkalinity as it ordinarily is, since in most of the waters after precipitation bicarbonates and a certain amount of carbonates, as for example, calcium carbonate, are still present, addition of a little more acid than that amount required to neutralize the phenolphthalein alkalinity is not harmful. But it is not desired in the present invention to make the water distinctly acid.

In utilizing the process of the present invention it will be noted that the necessity for the exact additions of chemicals in the precipitation step no longer occurs. This is a highly important advantage since it simplifies operations and apparatus. Further, in the neutralizing step, no great precision in the amount of acid to be added is necessary; and this is also advantageous.

In carrying out the process of the present invention, water is softened by the addition of lime alone or of lime and soda or lime and a barium salt or caustic soda or by any other known precipitation process in any of the ordinary ways or with any of the usual apparatus and the clear liquid is next treated with acid or acid reacting salt in about the amount corresponding to the caustic alkalinity or in amounts corresponding to the phenolphthalein alkalinity as the case may be. This may be done by simply blowing in a little carbon dioxid or products of combustion; or a solution of niter cake or dilute sulfuric acid may be added. Or ferrous sulfate or aluminum sulfate may be added in solution. Any precipitate which may be formed after the addition of an acidifying agent may be removed prior to sending the water through the bed of exchange silicates; or it may be allowed to pass forward to such bed where it will be filtered out, being thereafter removed by backwashing or the like. Passage of the water through a bed of exchange silicates may be performed in any of the usual ways (see Gans 1,195,923 or Duggan 1,276,629). It emerges completely softened.

In the neutralizing step, a little of the hardness is usually removed and particularly where sulfates of iron or alumina are used; but in a general way it may be said that the process of the present invention consists in the removal of hardness in two main steps: the bulk of it by precipitation and the rest by exchange silicates, the water subjected to precipitation being given a special treatment with acids or acid bodies prior to coming into contact with the silicates.

For the present purposes, neutral salts of weak bases may be considered as containing available acid since their acid radicals are capable of reacting with phenolphthalein and caustic alkalinity in the water.

What I claim is:—

1. The process of purifying hard water which comprises treating said water with an alkaline reagent to precipitate hardness-giving bodies therefrom with production of residual water displaying some alkalinity; then treating with material yielding available acid to react upon alkalinity remaining after such precipitation and then passing the so treated water through exchange silicates to remove residual hardness.

2. The process of purifying water which comprises treating said water with a reagent to precipitate hardness-giving bodies therefrom with production of residual water displaying some alkalinity; then treating with material yielding available acid to react upon soluble alkaline reacting bodies remaining after such precipitation and then passing the so treated water through exchange silicates to remove residual hardness.

3. The process of purifying hard water which comprises treating said water with a reagent to precipitate hardness-giving bodies therefrom with production of residual water displaying some alkalinity; then treating with material yielding available strong acid to react upon alkalinity remaining after such precipitation and then passing the so treated water through exchange silicates to remove residual hardness.

4. The process of purifying hard water which comprises treating said water with a reagent to precipitate hardness-giving bodies therefrom with production of residual water displaying some alkalinity; then treating with material yielding available strong acid to react upon soluble alkaline reacting bodies remaining after such precipitation and then passing the so treated water through exchange silicates to remove residual hardness.

5. The process of purifying hard water which comprises treating said water with an alkaline reagent to precipitate hardness-giving bodies with production of residual water displaying alkalinity; then treating the water with material yielding available acid in sufficient amount to remove the caustic alkalinity and then passing the so treated water through exchange silicates to remove the residual hardness.

6. The process of purifying hard water which comprises treating said water with an alkaline reagent to precipitate hardness-giving bodies with production of residual water displaying alkalinity and then adding to such water acid material in sufficient amount to remove not only caustic alkalinity but also a part or all of the phenolphthalein alkalinity which remains after the caustic alkalinity has been removed and then passing the so treated water through exchange silicates to remove the residual hardness.

In testimony whereof, I affix my signature hereto.

HEINRICH KRIEGSHEIM.